United States Patent [19]
Calmettes et al.

[11] Patent Number: 5,172,879
[45] Date of Patent: Dec. 22, 1992

[54] ATTACHMENT CLAMP

[75] Inventors: Lionel Calmettes; Michel André, both of Romorantin Lanthenay, France

[73] Assignee: Etablissements Caillau, France

[21] Appl. No.: 807,729

[22] Filed: Dec. 16, 1991

[30] Foreign Application Priority Data

Dec. 24, 1990 [FR] France ................. 90 16224

[51] Int. Cl.[5] ............................................. F16L 3/08
[52] U.S. Cl. ................................. 248/74.3; 24/23 EE
[58] Field of Search .................... 248/65, 68.1, 74.1, 248/74.3, 74.5; 174/163 R; 24/23 EE, 17 AP, 273, 277, 16 PB

[56] References Cited

U.S. PATENT DOCUMENTS

| 295,340 | 3/1884 | Bommarius | 24/23 EE |
|---|---|---|---|
| 2,373,300 | 4/1945 | Ellingwood . | |
| 2,397,279 | 3/1946 | Vesconte | 248/74.3 |
| 2,417,261 | 3/1947 | Morehouse | 248/74.3 |
| 2,466,912 | 4/1949 | Rice | 24/23 EE |
| 2,466,921 | 4/1949 | Tinnerman . | |
| 2,553,883 | 5/1951 | Tinnerman | 248/74.3 |

FOREIGN PATENT DOCUMENTS

| 446558 | 2/1948 | Canada | 248/74.3 |
|---|---|---|---|
| 651497 | 10/1962 | Canada | 248/74.3 |
| 3415294 | 10/1985 | Fed. Rep. of Germany | 248/74.5 |

Primary Examiner—J. Franklin Foss
Attorney, Agent, or Firm—Marshall & Melhorn

[57] ABSTRACT

An attachment clamp for securing a tube, a bundle of cables or like objects on a support is disclosed. A metal strap is wound on itself to constitute an open ring, of which one of the ends presents an extension for the passage of a fixing screw. A plurality of openings, transverse to the strap and constituted by embossed portions, are made in the end of the ring opposite the straight extension, while the other end of the ring bears an elongated tab substantially perpendicular to the straight extension. The free end of the tab is shaped as a hook directed towards the inside of the clamp and capable of being introduced in one of the openings in order to close the clamp.

4 Claims, 1 Drawing Sheet

ATTACHMENT CLAMP

FIELD OF THE INVENTION

The present invention relates to an attachment clamp or clip.

BACKGROUND OF THE INVENTION

U.S. Pat. No. 2 466 912 and U.S. Pat. No. 2 466 921 in particular disclose clamps or clips allowing simple fixation of a tube, a bundle of cables or like elongated objects on a plane support. Such clamps are used in very numerous industries, in particular in automobile and aeronautic construction, and in the building industry. The support on which the object is to be fixed may thus be a plane zone of the housing of an apparatus, or any partition, metallic or not.

A clamp or clip of the type in question essentially comprises a metal strap partially wound on itself to constitute an open ring, inside which the object to be fixed will be introduced. One of the ends of the ring presents a straight extension presenting a circular hole for the passage of a screw for securing the clamp on its support. To ensure closure of the ring, generally without considerable force, there are provided, on the one hand, a plurality of openings transverse with respect to the strap, formed in the end of the ring opposite the straight extension, on the other hand, on the other end of the ring, an elongated tab substantially perpendicular to the straight extension. The free end of said tab is shaped as a hook, directed towards the interior of the clamp and capable of being introduced in one of said openings, in order to close the ring of the clamp.

Known clamps of this type and particularly those described in the Patents mentioned above, present various drawbacks.

On the one hand, the straight extension is relatively fragile and may be deformed too easily with respect to the ring of the clamp. On the other hand, the embodiment of the hooking tab provided on the straight extension leads to a notable loss of material of the strap. Finally, it must also be emphasized that the shape of the openings adapted to receive the hook located at the end of the tab leads to giving this hook, and consequently the strap itself, a relatively large thickness to avoid any deformation of the hook after the ring of the clamp has been tightened. This results in that, for any dimension of the clamp, its weight and cost price are relatively, and unnecessarily, high.

It is an object of the present invention to provide an attachment clamp of the type which has just been recalled, of which the structure has been improved in order to eliminate the drawbacks set for hereinbefore.

SUMMARY OF THE INVENTION

According to a first feature of the invention, the transverse openings adapted to receive the hook of the tab are constituted by embossed portions or "slashes". Such an embossed portion is known to be obtained by a simple rectilinear cut-out in a metal strap without removing any metal, this operation being followed by a stamping in order locally to deform the strap to produce an oblique slot with respect to the plane of the strap.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
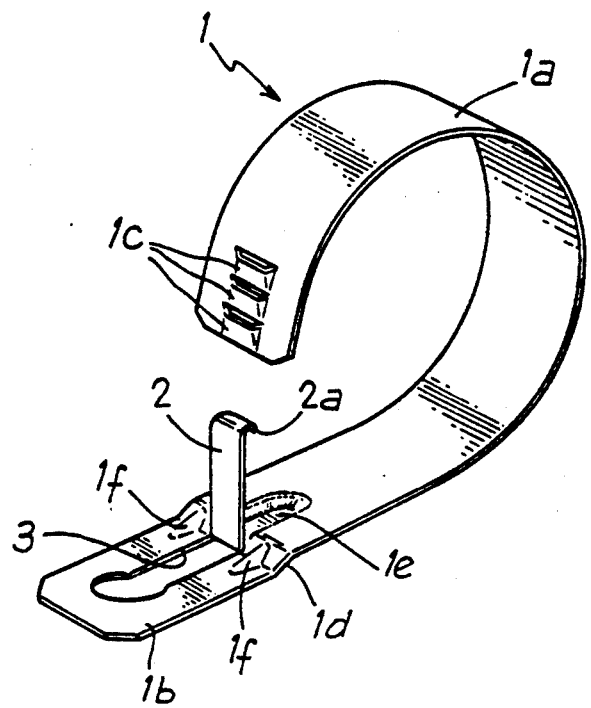
FIG. 1 is a view in perspective of a clamp according to the invention, in its open position.

Referring now to the drawings, a clamp 1 is shown, constituted by a strap of metal wound on itself so as to form an open ring 1a of which one of the ends is provided with a rectilinear extension 1b. A tab 2 is disposed on extension 1b in the vicinity of its join with ring 1a and is substantially perpendicular to the plane of this extension. The free end of the tab 2 is shaped as a hook 2a directed towards the inside of the ring.

To obtain the tab 2, and as shown in the drawings, a partial cut-out is firstly made in the extension 1b, on the two large sides and the small side closest to the end of extension 1b, of an elongated rectangle in the longitudinal direction of the strap. The portion thus cut out is then straightened up towards the inside of the ring 1a, i.e. towards its end bearing openings 1c, and constitutes tab 2. After this operation, a hole 3 therefore remains in extension 1b.

On the end of ring 1a opposite extension 1b are provided a plurality of openings 1c, made transversely to the strap. As may be seen, these openings result from the formation of embossed portions extending only over a part of the width of the strap. It will be noted that these embossed portions, depending on circumstances, may project either inwardly or outwardly of the clamp.

Furthermore, it is generally desirable to reinforce the zone of join 1d between the extension 1b and the end of the ring 1a which bears it. To that end, zone 1d is constituted by a small shoulder delimited by two transverse folds, with the result that extension 1b projects slightly towards the outside of the clamp, with respect to the portion of the ring which bears it. A boss 1e made by stamping the strap, projects outside the clamp and extends longitudinally, from extension 1b over the portion which bears it. The outer face of boss 1e is located in the same plane as extension 1b. The reinforcement thus obtained is completed by two substantially longitudinal ribs 1f located in the zone of join 1d in the vicinity of the lateral edges of the strap and extending somewhat over the extension 1b and over the ring 1a.

The clamp which has just been described is used in a manner similar to that of the clamps described in the Patents mentioned in the preamble. The object to be secured (tube, bundle of cables, etc. . . . ) is introduced into ring 1a whilst the latter is in its open position shown in FIG. 1. This operation may be effected by slide, transversely to the clamp, or, on the contrary, by employing the elasticity of the material of the strap to increase the opening of ring 1a sufficiently.

In numerous cases, a supple and possibly isolating sheath (not shown) is disposed around the ring 1a and its mere presence enables the clamp to be provisionally maintained in place on the object to be secured. However, it may be necessary to complete this provisional assembly by closing the clamp by engaging the hook 2a in the endmost opening 1c.

Figure 2:
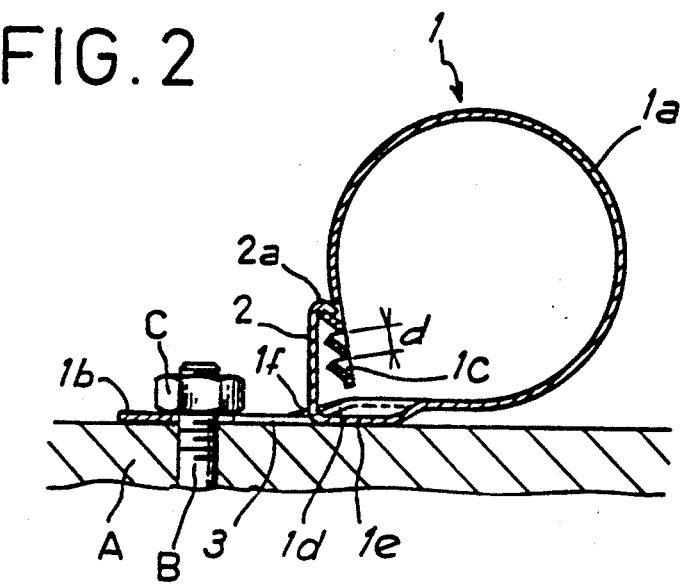
FIG. 2 is a side view of the clamp shown in FIG. 1, in its closed position.

The clamp is then mounted on its support A, shown in FIG. 2, on which a threaded shank B is advantageously welded. After engagement of hole 3 over the end of shank B, a nut C allows the clamp to be secured on its support. In certain cases, as may be seen in FIG. 1, the hole 3 presents a rounded end corresponding to the diameter of the shank B. Boss 1e, in addition to the reinforcement that it gives the assembly thus secured, increases the bearing zone of the clamp on its support and thus ensures stable fixation.

After having correctly adjusted the position of the object to be attached in the clamp, the latter is energetically closed by engaging hook 2a of tab 2 in that of openings 1c which may be reached without deteriorating the object. In practice, the upper part of ring 1a will be pressed strongly (FIG. 2) until the desired opening 1c is brought opposite hook 2a which will engage therein automatically thanks to the elasticity of tab 2.

If the object attached in the clamp is to be dismantled, it is not necessary to remove nut C. On the contrary, it suffices to release hook 2a from the opening 1c in which it is located in order to be able to slide the object in the clamp or possibly remove it through the opening thus created in ring 1a.

The ease of using this type of clamp, as has just been described, constitutes one of its principal advantages. However, it should also be emphasized that, thanks to the particular arrangements provided by the invention, manufacture of the clamp is particularly economical.

On the one hand, there is virtually no waste of material constituting the strap. In particular, hole 3 results essentially from the space made free by straightening up tab 2 and it is not necessary, as was the case of the known clamps, to provide a special hole for the passage of the threaded shank for fixation.

Similarly, it has already been emphasized that the embossed portions necessary for forming openings 1c do not cause any discarding of material of the strap. It should be added here that the "pitch" d (FIG. 2) of the rack formed, i.e. the distance between the cut-outs of two contiguous openings 1c, is smaller than the "pitch" of the openings provided on the known clamps of the same dimensions; this results in the tightening of the ring 1a being facilitated and more precise.

In addition, and this advantage is particularly important, the engagement of hook 2a in the oblique slot of an opening 1c prevents it from being deformed: its upper face in fact buttresses the upper edge of the opening. This results in the possibility, for a determined tightening force, to reduce the thickness of the hook and consequently of all the strap constituting the clamp. Moreover, all other conditions being conserved, the thickness of the strap may be reduced without being detrimental to the necessary rigidity of zone 1d joining ring 1a and its straight extension 1b, thanks both to ribs 1f and to boss 1e.

Finally, all the arrangements provided by the invention combine to reduce the weight and consequently the cost price of the clamp; in fact, it has been determined that a saving of material of about 30% may be made with respect to the manufacture of known clamps.

What is claimed is:

1. A clamp for attachment to a supporting structure, comprising:
    a) a metal strap wound on itself to form an open ring and including a first and a second end;
    b) a plurality of transversely extending, longitudinally spaced, raised ribs formed adjacent the first end thereof;
    c) a rectilinear extension formed on the second end of said strap and including an opening in said extension to receive an attachment member; and
    d) a hook formed proximate the second end of said strap, said hook displaced from the plane of said strap and flexibly adapted to engagement behind a selected one of said ribs.

2. A clamp according to claim 1, wherein the second end includes, between said hook and said ring, at least one outwardly projecting elongate boss located substantially in the same plane as the extension.

3. The clamp of claim 2, wherein the zone of join of the straight extension on the corresponding end of the ring presents at least one reinforcing rib, elongated in the longitudinal direction of the strap constituting the clamp, disposed in the vicinity of a lateral edge of said strap and extending somewhat over the extension and on the corresponding end of the ring.

4. The clamp of claim 1, wherein said hook is disposed adjacent said opening, between said opening and said plurality of ribs.

* * * * *